United States Patent [19]

Tanaka et al.

[11] 4,354,570
[45] Oct. 19, 1982

[54] ARRANGEMENT OF AIR CLEANER FOR A MOTORCYCLE

[75] Inventors: Norio Tanaka, Toda; Kentaro Ito, Asaka, both of Japan

[73] Assignee: Honda Giken Kogyo Kabushiki Kaisha, Tokyo, Japan

[21] Appl. No.: 188,610

[22] Filed: Sep. 19, 1980

[30] Foreign Application Priority Data

Sep. 21, 1979 [JP] Japan .......................... 54-131795[U]

[51] Int. Cl.³ .............................................. B62J 17/00
[52] U.S. Cl. .................................. 180/219; 55/385 B; 180/225
[58] Field of Search ............... 180/225, 219, 190, 192; 55/385 B

[56] References Cited

FOREIGN PATENT DOCUMENTS

| 908696 | 8/1972 | Canada .............................. 180/190 |
| 796952 | 2/1954 | Fed. Rep. of Germany ...... 180/225 |
| 1002645 | 2/1957 | Fed. Rep. of Germany ...... 180/225 |
| 141194 | 4/1920 | United Kingdom ................ 180/225 |
| 737327 | 9/1955 | United Kingdom .............. 55/385 B |

Primary Examiner—John A. Pekar
Attorney, Agent, or Firm—Polster, Polster and Lucchesi

[57] ABSTRACT

Air cleaner for a motorcycle is disposed in an internal space of a hollow fairing of the motorcycle, and is communicatively connected with a carburetor of an engine of the motorcycle through a conduit pipe.

2 Claims, 3 Drawing Figures

ARRANGEMENT OF AIR CLEANER FOR A MOTORCYCLE

BACKGROUND OF THE INVENTION

This invention relates to an air cleaner for a motorcycle, and, more particularly, it is concerned with a particular arrangement of the air cleaner utilizing a space in a hollow fairing with a head light fitted at its front center part.

At present, in the medium- or large-sized motorcycles, an air cleaner device is arranged in a space below a rider's seat. In this space, however, there are also accommodated battery, electrical appliances, and other component parts, on account of which the capacity of the air cleaner is considerably restricted. In order to eliminate such restriction, the space below the rider's seat needs be broadened. With such measures, however, the height of the seat becomes unnecessarily increased, or the width of the motorcycle body in the left and right directions thereof becomes wider with the consequence that there arises such a problem that the motorcycle lacks in stability when the rider rides on the motorcycle and touches his feet on the ground.

On the other hand, there has been known, as this kind of motorcycle, such one that is provided with a hollow fairing having a head light in the upper front side of the motorcycle body, which is to be used as a glove box, etc..

SUMMARY OF THE INVENTION

It is a primary object of the present invention to provide an improved arrangement for the air cleaner device having sufficient capacity without increasing the space below the rider's seat.

It is another object of the present invention to provide an improved arrangement for the air cleaner device, wherein an internal space of the abovementioned hollow fairing is utilized, to accommodate the air cleaner therein.

According to the present invention, in its general aspect, there is provided arrangement of air cleaner for a motorcycle, wherein the air cleaner is disposed in an internal space of a hollow fairing of the motorcycle and is communicatively connected with a carburetor of an engine of the motorcycle through a conduit tube.

There has thus been outlined, rather broadly, the more important feature of the present invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception, upon which this disclosure is based may readily be utilized as a basis for the designing of other structures for carrying out the several purposes of the present invention. It is important, therefore, that the claims be regarded as including such equivalent construction so far as they do not depart from the spirit and scope of the present invention.

BRIEF DESCRIPTION OF THE ACCOMPANYING DRAWING

Specific embodiment of the present invention has been chosen for the purpose of illustration and description, and is shown in the accompanying drawing, forming a part of the specification, in which.

DETAILED DESCRIPTION OF PREFERRED EMBODIMENT

Figure 1:
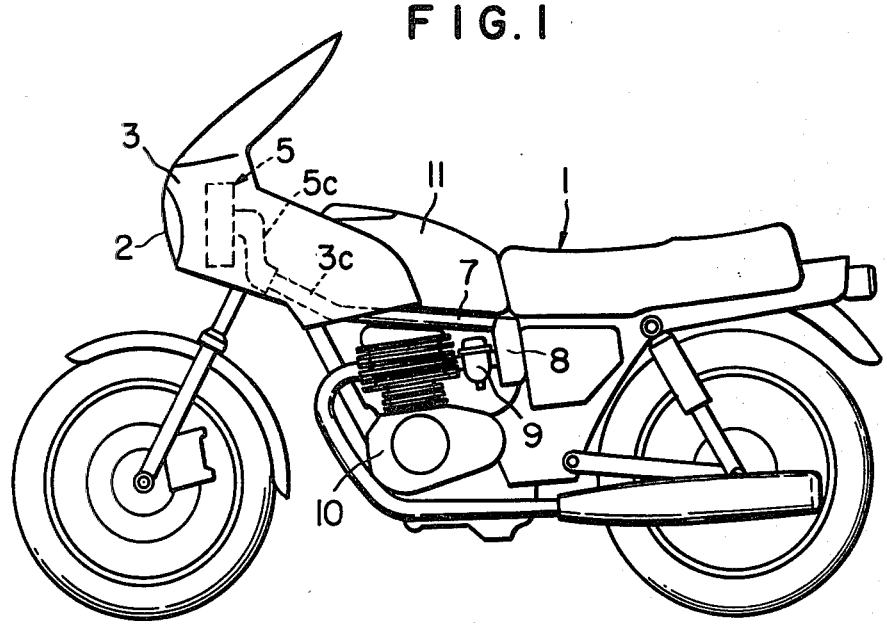
FIG. 1 is a side elevational view of a motorcycle, to which the present invention has been applied.
Figure 2:
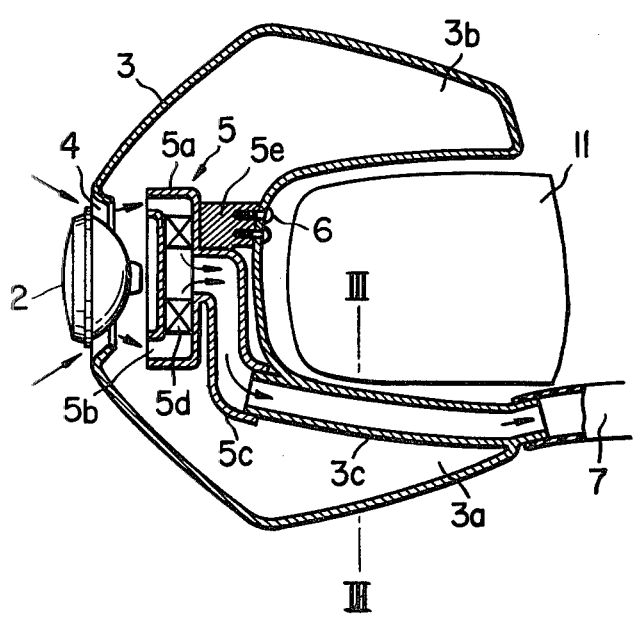
FIG. 2 is a plan view, in cross-section, of one embodiment of the arrangement according to the present invention.
Figure 3:
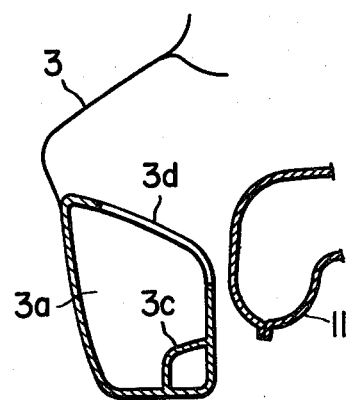
FIG. 3 is a cross-sectional view of the fairing taken along a line III—III in FIG. 2.

In the following, the present invention will be explained in detail in reference to the accompanying drawing showing a preferred embodiment thereof.

In the drawing, a reference numeral 1 designates a motorcycle body. The motorcycle body 1 has, on its front upper part, a hollow faring 3 in a substantial form of a letter "U" in its cross-section with a head light 2 being provided at its front center part. Around the outer periphery of the head light in the fairing 3, there is formed an air passage opening 4 which permits air to flow in and out of the hollow fairing. In confrontation to the air passage opening 4, there is disposed an air cleaner 5 within the faring 3.

The air cleaner 5 comprises a casing 5a, an air inlet port 5b which is formed within the casing 5a in confrontation to the air passage hole 4, an air outlet tube 5c provided at the rear surface of the casing 5a, and a doughnut-shaped filter 5d interposed between the air inlet port 5b and the air outlet port 5c. The air cleaner 5 is fixedly provided in the internal space of the hollow fairing 3 by screwing threaded bolts 6 into a bracket 5e provided on the rear surface of the casing 5a from the back side of the faring 3.

Both side parts 3a, 3b of the hollow faring 3 are used as the glove boxes. In one of the side parts (for instance, 3a), there is integrally formed a conduit section 3C, one end of which is connected with the air outlet tube 5c of the air cleaner 5, and the other end of which is connected with a pre-chamber 8 through a connecting tube 7 such as rubber tube, etc. to reduce the dynamic pressure at the time of cruising. When the connecting tube 7 is directly connected with a carburetor 9, the opening face of the air inlet port 5b may be changed to the lateral side or rear side.

In the above-described construction, air which has been led through the air passage opening 4 around the outer periphery of the head light 2 is cleaned in the air cleaner 5, and then introduced into the pre-chamber 8, carburetor 9, and engine 10 through the conduit part 3c. A reference numeral 3d designates a compartment for small articles, and 11 refers to a fuel tank. The conduit section 3c is not always necessary to be formed integrally with the faring 3.

As stated in the foregoing, the present invention is capable of providing the air cleaner having sufficient capacity without widening a space below the rider's seat by utilizing the internal space of the hollow fairing, in which the air cleaner is disposed. Further, since the air passage opening to the air cleaner is provided around the outer periphery of the head light, relatively clean external air can be introduced into the air cleaner, which is effective in maintaining the function of the air cleaner over a long period of time. In addition, since the conduit section is provided within the space of the hollow fairing, there accrues such a design merit that the outer appearance thereof is aesthetically pleasing.

What is claimed is:

1. An arrangement of air cleaner for a motorcycle, wherein said air cleaner is disposed in an internal space of a hollow fairing of said motorcycle, and is communicatively connected with a carburetor of an engine of said motorcycle through a conduit pipe, characterized in that said air cleaner disposed in the internal space of said hollow fairing of said motorcycle is in confrontation to an air passage opening defined in said fairing surrounding a head light of said motorcycle.

2. In a motorcycle having a hollow fairing provided on the front upper part of said motorcycle body and surrounding a head light in the midst thereof, an arrangement of an air cleaner for said motorcycle, in which an air passage opening is defined between the outer circumference of said head light and said fairing surrounding the head light, said air cleaner is disposed in an internal space of said faring and in confrontation to said air passage opening, and a conduit tube is provided in a manner to communicatively connect said air cleaner with a carburetor of an engine of said motorcycle to supply clean air thereinto.

* * * * *